2,997,782
POWER-INSERTING TOOL
Theodore B. Eddy, Brookfield, Conn., assignor to Heli-Coil Corporation, Danbury, Conn., a corporation of Delaware
Filed Sept. 25, 1959, Ser. No. 842,305
5 Claims. (Cl. 29—240.5)

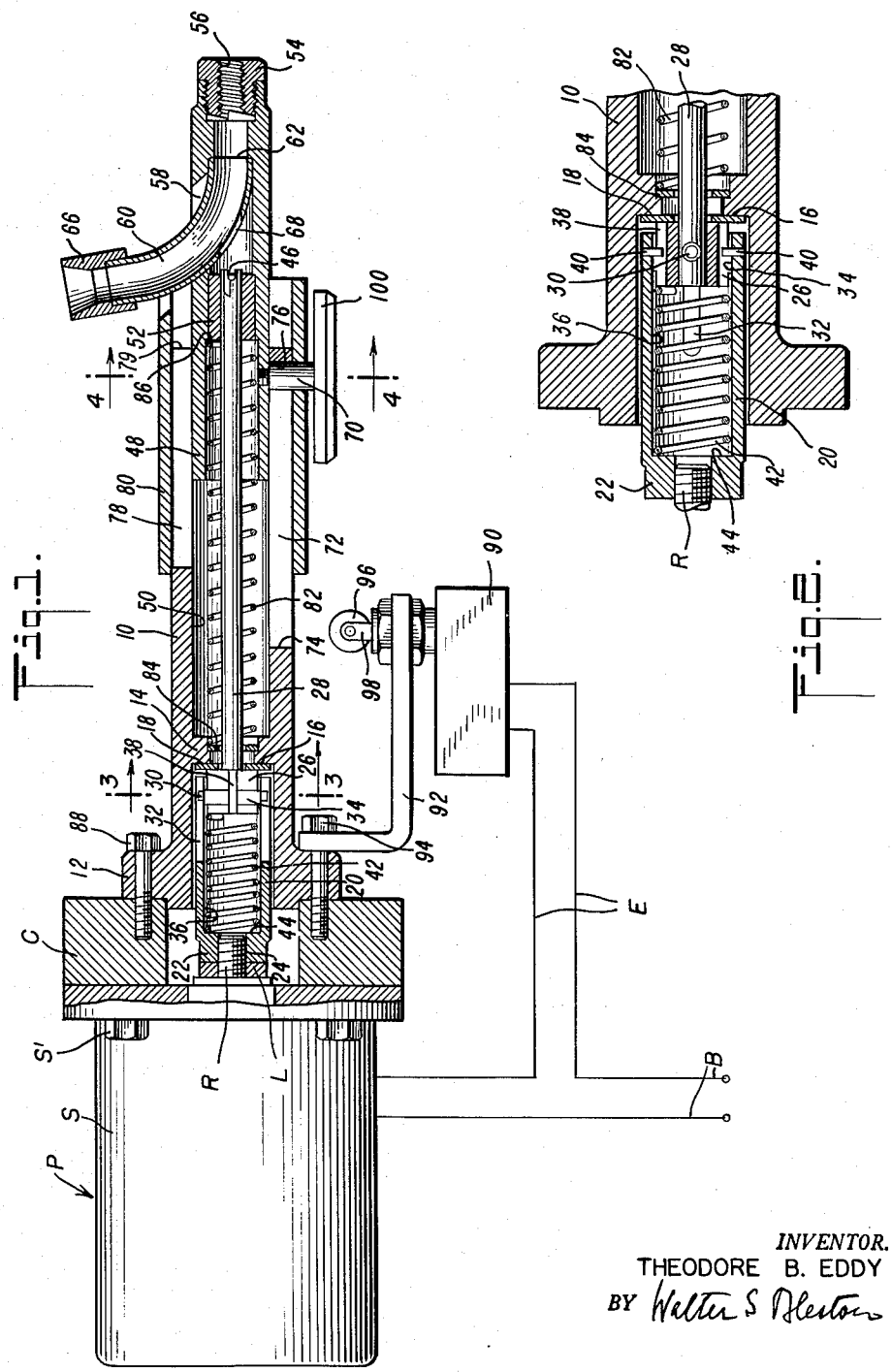

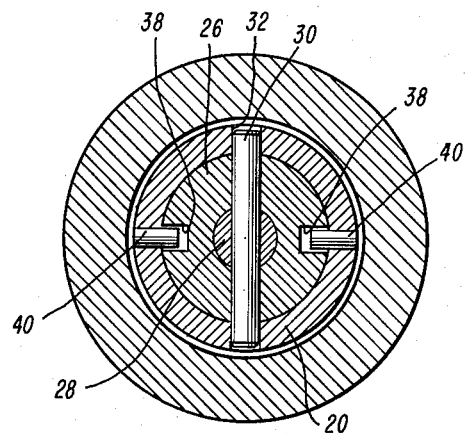
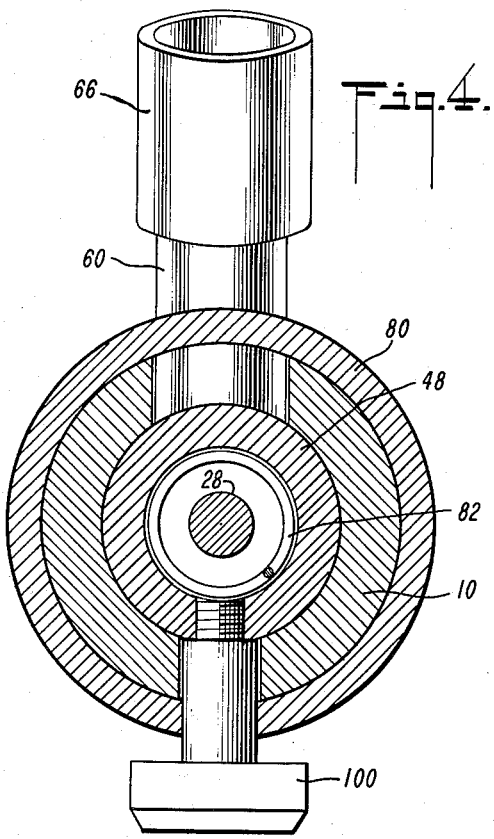
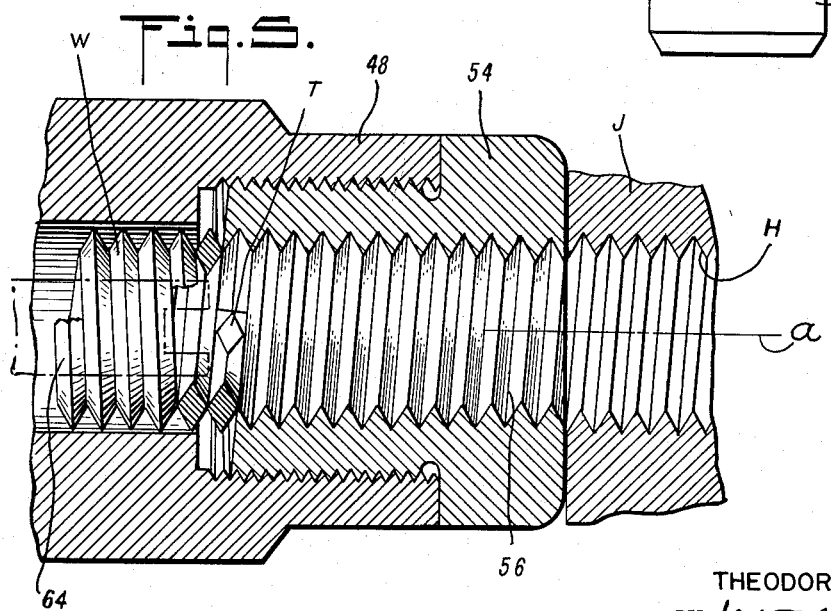
INVENTOR.
THEODORE B. EDDY
BY Walter S. Pleston
ATTORNEY United States Patent Office 2,997,782
Patented Aug. 29, 1961

The invention relates to a power driven inserting tool for wire coil screw thread forming inserts. Such inserts are used to provide tapped holes in a boss of a relatively soft material with a hard resistant screw thread or to repair worn or damaged inner threads of parts which by means of the inserts become useful again. The inserts are conventionally provided at one end with a tang which can be gripped by a tool for screwing the insert into a tapped hole. As the inserts, prior to their installation, are usually wound with an oversized diameter, it is frequently necessary to contract them to the size of the tapped hole before they are screwed into it. Tools for this purpose are conventionally provided with a prewinder tip having an inner screw thread by means of which the insert diameter will be decreased from that of the non-contracted insert to that of the tapped hole. As the mandrel has to grip the tang from the interior of the insert in order to screw the latter through the prewinder, the diameter of the mandrel in its conventional form is slightly smaller than the inner diameter of the insert when contracted. Wherever such tools are destined and designed for manual operation they function fully satisfactorily. However, power driven tools which have also been proposed for the indicated purpose, in many cases showed some drawbacks in that e.g. they were prone to damage the insert, or they were too complicated, or where an automatic or semi-automatic feeding was required, it happened that an insert fed to the tool did not arrive in the proper position relatively to the prewinder tip.

The invention aims, therefore, to provide an inserting tool for power drive, which is of a simple construction, which prevents an engagement of the tang of the insert by a tool part which is rotating at a relatively high speed, and which allows feeding of an insert to the proper place and in the proper position.

The invention further aims the provision of a tool comprising a tubular body which can be rigidly connected with one of its ends to the stator of a prime mover, a mandrel with a slotted foot end and a head which can be connected to the rotor of the prime mover, and a prewinder, telescopically projectable from the tubular body whereby when the prewinder is pushed back into the latter a predetermined distance, the slotted mandrel end will engage the tang of an insert fed into the prewinder before the prime mover has been started.

The invention also aims to provide a tool of the aforementioned type with a curved feeding tube entering the prewinder from the side and having its end located interiorly of and coaxial with the prewinder, the tube wall being provided with a hole through which the mandrel can pass.

Further objects and details of the invention will be apparent from the following description and the accompanying drawing illustrating an embodiment thereof by way of example. In the drawing:

FIG. 1 is a longitudinal cross-section of a tool according to my invention with a prime mover attached thereto.

FIG. 2 is a partial longitudinal cross-section at 90° in respect to FIG. 1,

FIGS. 3 and 4 are cross-sections according to lines 3—3 and 4—4 respectively of FIG. 1, and FIG. 5 is a cross section of the prewinder end of the tool on a larger scale with an insert in position to be screwed through the tip.

Referring now to the drawing, the illustrated tool comprises a tubular body 10 having an outer flange 12 at one of its ends and an inner flange 14 forming a shoulder 16 at a distance from the flange 12. A thrust bearing 18 leans on shoulder 16 for a purpose to be explained later. The inner portion of the body 10 at its flange-provided end is occupied by a sleeve 20 with a flattened outer end 22 for wrench application and with an inner thread 24. Within the interior of the sleeve 20 the head 26 of a mandrel 28 is axially shiftable. The mandrel head 26 is provided with a diagonal pin 30 which engages with its free end into longitudinal slots 32 in the wall of the sleeve 20. The mandrel head has a circumferentially projecting portion 34 which engages the inner sleeve surface 36 to be guided thereby. The head has also two longitudinal grooves 38 engaged by pins 40 which serve the purpose of retaining during the assembling a spring 42 bearing endwise on the mandrel head and on an inner shoulder 44 of the sleeve 20 so that the head 26 is normally supported by the thrust bearing 18. Pin 30 furthermore secures the mandrel head 26 to the mandrel body 28. The foot end of the mandrel, which extends through the length of the tool body 10, projects therefrom a certain distance. It is provided with a slot 46 for the engagement of the tang T of an insert W, best visible in FIG. 5, to be installed in a tapped hole H of a boss member J.

Within the tubular body 10 a prewinder body 48 is telescopically shiftable and guided by the inner wall 50 of the body 10. The prewinder body is also a tubular member in which a guide bushing 52 for the mandrel is secured by means not shown. Into the outer projecting end of the prewinder body a prewinder tip 54 is screwed by means of a left-handed thread if the insert is wound right-handed. The tip has an inner threading 56 adapted to contract an insert when screwed therethrough with the aid of the mandrel 28. At a distance from the prewinder tip, the wall of the prewinder body 48 is recessed at 58 and a continuously curved feeding tube 60 is inserted through the recess so that the inner end 62 of the tube is located at a predetermined distance from the prewinder tip 54 and directed coaxially with the latter and also with the prewinder body. The curvature of the tube 60 is so selected that an insert can slide down unhampered and reach the prewinder in the proper position, i.e., coaxial with the latter. Depending on the direction in which the tool is used, the outer end of the tube 60 may be curved as shown, or it may, e.g., be curved reversely in respect to the inner tube portion if the tool is used with its axis in a vertical position. Means may be provided to connect the tube end outside the tool with a feeder device (not shown), such as a magazine or a hopper to supply one insert after the other at selected intervals through the tube to the inner end of the prewinder tip in the position indicated at 64 in FIG. 5. For this purpose, a sleeve 66 is attached to the outer end of the tube 60, which sleeve may be connected with its other end to a chute or the like from the aforementioned feeder device, which may be automatically, semi-automatically or manually operative. The wall of the tube 60 is recessed at 68 in its portion on the side of the mandrel so that the latter can enter through the recess, as it will be described later. As hereinbefore stated, the prewinder body is telescopically shiftable in the tool body 10. However, it is prevented from rotating with the latter by means of a pin or other radial projection 70 extending from the prewinder body and being slidable in a longitudinal slot 72 in the wall of the body 10. Thus, the inner end 74 of the slot may serve as an abutment to define an inner end position of the prewinder whereas the outer end 76 of the slot defines the outer end position of the prewinder body. Another slot 78 is provided in body 10 opposite the slot 72. This slot is open at its outer end 79 and is of such a width that the tube 60 can slide therein, and the slots 72 and 78 are of such lengths that the prewinder can be shifted inwards sufficiently far for the mandrel foot end with slot 46 to pass through the recess 68, the prewinder tip 54 and the tapped hole H to the end location of the tang of an insert installed to its final position in the hole H. A sleeve 80 covers the slot 78 and is secured to the aforementioned pin 70 so that it is slidable on the outside of the tool body 10 when the prewinder is shifted relatively thereto. A spring 82 interiorly of the tool body 10 bears against an inner projection 84 close to the bearing 18 and with its other end interiorly of the prewinder body on a shoulder 86 formed where the mandrel guide 52 is secured to the body 48.

In order to rotate the mandrel the tool body 10 may be secured to the stator portion S of a prime mover P. For this purpose the flange 12 may be affixed by screws 88 either directly to the stator S or to an intermediate piece C which in turn may be affixed to the stator S by screws S', as shown in the drawing. The threaded shaft R, being part of the rotor of the prime mover, may be screwed into the thread 24 of the sleeve end 22, which connection may be secured by a lock nut L. Means are provided in order to start the prime mover at a predetermined time when the slotted mandrel end is about to engage the tang of the insert in its position 64. In the illustrated embodiment it is assumed that the prime mover is an electric motor but it will be clear that with obvious modifications of the starting device, prime movers of any other suitable kind may be used. The illustrated starting means comprises a limit switch 90 carried by a bracket 92 which in turn is secured by a screw or screws 94 to a portion of the assembly which is stationary relatively to the tool body 10. The limit switch 90 is normally open and can be closed by pushing in the plunger 98 provided with roller 96. The limit switch will be connected by leads E to an electric power source B and the prime mover P. In order to operate the limit switch in accordance with the movement of the prewinder a cam 100 is secured to the outer end of the pin 70. Of course, the parts 70 and 100 may constitute a single piece connected to the prewinder body 48. The cam 100 projects towards the limit switch so far that it will operate the switch when, upon the prewinder being pushed in, the mandrel is in a position ready to engage the tang of an insert in the position 64. The length of the cam is at least such that the limit switch remains closed until the insert engaged by the mandrel has reached the desired depth in the hole H.

The tool just described operates in the following manner:

The tool body 10 and sleeve 20 will be connected to the prime mover P, for instance, in the manner hereinbefore described. Part C in this assembly may be any means, for instance, a carriage, to move the assembly in the axial direction of the tool, either automatically or semi-automatically or even manually. The tool may then be brought into contact with the boss J so that the axis $a$ of the tool coincides with the axis of the hole H. An insert will now be supplied through the tube 60 so as to bear on the prewinder tip. The insert cannot be caught in the hole 68 of the tube as the hole will be smaller than the outer diameter of the insert or inner diameter of the tube, in fact, not larger than necessary to let the mandrel foot end portion pass which, as stated hereinbefore, will have a diameter slightly smaller than the inner diameter of the insert when contracted. Thereupon the assembly is moved in the axial direction towards the boss J whereby the prewinder is pushed inwards against the restraint of the spring 82. Owing thereto, the mandrel will enter through the hole 68 of the tube 60 into the insert W and engage the tang of the insert. At that time the cam 100 will begin to depress the roller 96 so as to close the limit switch 90 and thereby to start the prime mover. If the first engagement of the mandrel with the tang takes place by the ultimate mandrel end rather than by the bottom of the slot 46, a slight shift of the mandrel towards the prime mover will occur against the restraint of the spring 42 whereby it is possible for the prewinder to enter sufficiently far into the tool body so that the cam can operate the limit switch and start the prime mover. On account thereof the mandrel will turn in relation to the insert until the slot registers with the tang so that proper engagement of the tang in the slot can occur owing to the action of spring 42 which will urge the mandrel back against its thrust bearing 18. Upon further rotation of the mandrel while simultaneously the assembly is being properly advanced in the axial direction, the insert will be screwed first through the prewinder tip and then while thus contracted into the hole H. When the insert has been properly installed, at which time the pin 70 may or may not have reached the end 74 of slot 72, the whole assembly may be withdrawn allowing spring 82 to project the prewinder into the illustrated position and the prime mover to stop as soon as the cam 100 has left the roller 96. After feeding another insert through the tube 60 and bringing another tapped hole H of a boss into coaxiality with the tool, the operation can be repeated.

It will be apparent to those skilled in the art that many modifications and alterations of the structure illustrated and described can be made without departure from the essence and spirit of the invention which for that reason shall not be limited but by the scope of the appended claims.

I claim:

1. A tool of the character described comprising a tubular tool body adapted to be connected with one of its ends to the stator part of a prime mover, a prewinder mounted for reciprocal movement in the tubular tool body and normally projected from the other end of said tool body but non-rotatable in respect to the latter, said prewinder including a tubular body and an interiorly screw-threaded prewinder tip adapted to effect a contracting of an insert which is to be rotated and screwed therethrough prior to being installed in a boss, the wall of said prewinder body being provided with a recess at a distance from said tip, a curved insert-feeding tube inserted into said recess with its open inner end fixed into said prewinder body co-axially therewith and at a predetermined distance from said tip, said feeding tube being shaped in the form of a continuous arc from the outside to the open end of the tube, a rotatable mandrel mounted interiorly of said tool body and including a head end adapted to be driven by the rotor of said prime mover, and a foot end of a diameter slightly smaller than the inner diameter of said insert when contracted and provided with a slot, said mandrel projecting with its foot end into said prewinder body, the wall of said curved tube opposite said tip being provided with a hole large enough but not larger than required for said slotted mandrel end to pass therethrough and to enter said curved tube to engage with said slot the tang of an insert fed through said curved tube to the prewinder tip when said prewinder body is being shifted inwards with respect to said tool body.

2. A tool of the character described comprising a tubular body adapted to be connected with one of its ends to the stator part of a prime mover, a prewinder mounted for reciprocal movement in the tubular tool body and normally projected from the other end of said tool body but non-rotatable in respect to the latter, said prewinder including a tubular body and an interiorly threaded prewinder tip adapted to effect a contracting of an insert which is to be rotated and screwed therethrough prior to being installed in a boss, the wall of said prewinder body being provided with a recess at a distance from said tip, a curved insert-feeding tube inserted into said recess with its open inner end fixed into said prewinder body coaxially therewith and at a predetermined distance from said tip, a rotatable mandrel mounted interiorly of said tool body and including a head end adapted to be driven by the rotor of said prime mover, and a foot end provided with a slot, said mandrel projecting with its foot end into said prewinder body, the wall of said curved tube opposite said tip being provided with a hole through which said slotted mandrel end can enter said curved tube to engage with said slot the tang of an insert fed through said curved tube to the prewinder tip when said prewinder body is being shifted inward with respect to said tool body, a sleeve rotatable in the end portion of said tool body opposite said prewinder body and adapted to be connected to said prime mover rotor, said mandrel including a head connected for rotation with said sleeve and axially movable some distance in relation thereto, a spring between an inner shoulder of said sleeve and said mandrel head to urge the mandrel into an outer end position, a lost motion connection between said tool body and said prewinder body and defining an outer end position of the latter in which the prewinder body is projected outwardly a distance sufficient so that the foot of the mandrel in said end position of the latter is free of the curved tube, and another spring between an inner shoulder of said tool body and said prewinder body and tending to urge the latter into its said outer end position.

3. A tool as in claim 2, further comprising a thrust bearing supported in said tool body, said mandrel head engaging said thrust bearing when said mandrel is in its end position.

4. A power inserting tool for a wire coil screw thread insert having a tang on one end to form a grip, said tool comprising a tubular tool body adapted to be rigidly connected with its one end portion to the stator of a prime mover, a drive sleeve rotatable in said end portion and adapted to be connected to the rotor of the prime mover, a tubular prewinder body mounted for reciprocal movement in the tubular tool body and normally projected from the other end of said tool body into a predetermined end position, said prewinder body being non-rotatable with respect to said tool body, an interiorly screw threaded prewinder tip rigid with the projecting end of the prewinder body, said prewinder body being provided with a lateral recess at a distance from said tip, a curved insert-feeding tube inserted with its one end through said recess into said prewinder body so that said end is co-axial with said body inside thereof at a predetermined distance from said tip, a first spring between the tool body and the prewinder body tending to shift the prewinder body into a projected end position, a mandrel having a head end in axially shiftable relationship connected to said sleeve and a slotted foot end adapted to grip said insert tang, a second spring between said sleeve and the mandrel head tending to shift said mandrel into a projected end position in which said slotted end is free of said curved tube on the side opposite said tip when said prewinder body is in its projected end position, the wall of said curved tube being provided with a hole through which said mandrel foot can pass when the prewinder body is pushed inward against the restraint of said first spring.

5. A tool as in claim 4, further comprising a projection disposed from the surface of said prewinder body, said tool body being provided with a longitudinal slot engaged by said radial projection, a normally open switching device to excite said prime mover when closed, said switching device being stationary with said tool body, and a cam member secured to said radial projection and adapted to close said switch when said prewinder body has been shifted a predetermined distance from said end position inward with respect to said tool body.

References Cited in the file of this patent
UNITED STATES PATENTS

| | | |
|---|---|---|
| 1,311,590 | Bingham | July 29, 1919 |
| 2,754,860 | Moore et al. | July 17, 1956 |
| 2,855,661 | Forster | Oct. 14, 1958 |